UNITED STATES PATENT OFFICE.

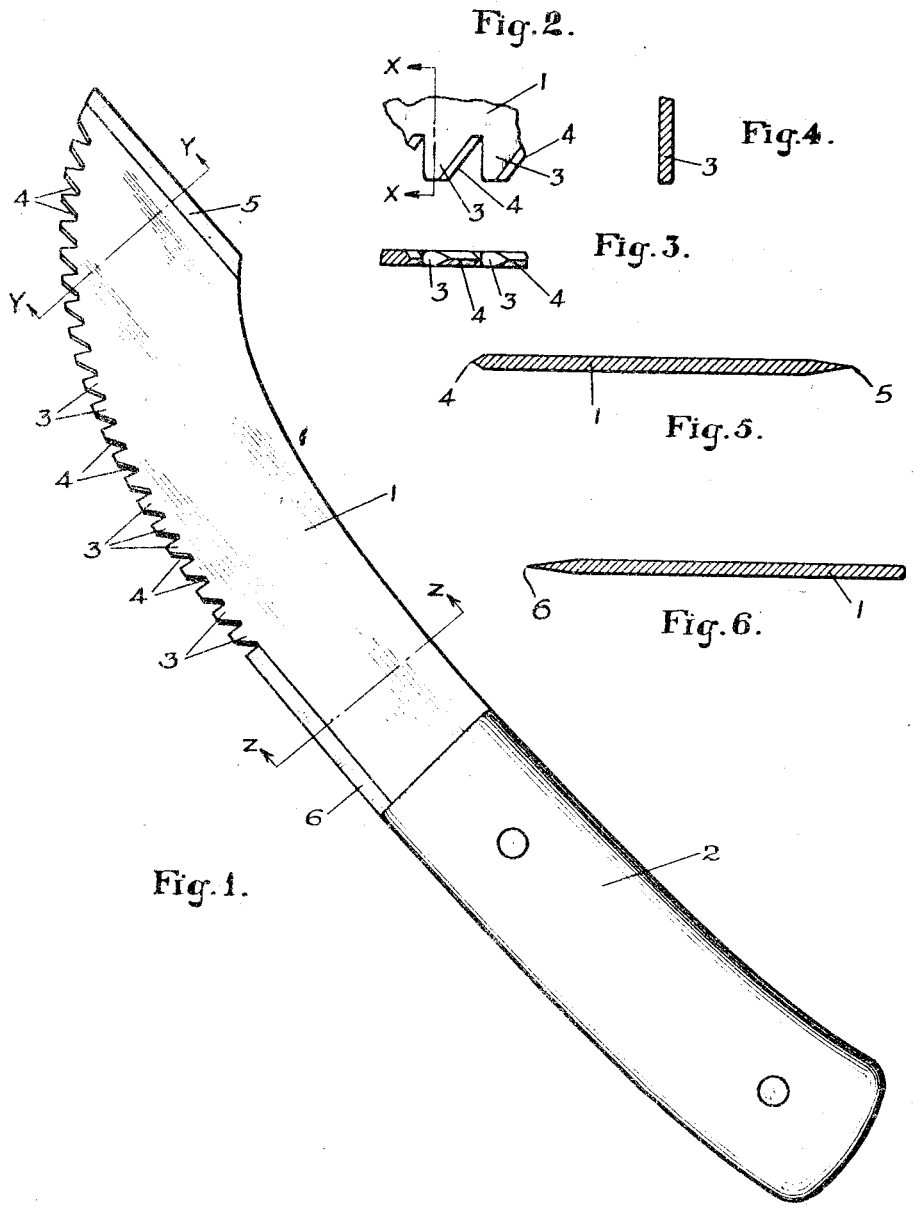

JOHN ROUSE, JR., OF NORTH CHICAGO, ILLINOIS.

SKINNING-KNIFE.

1,051,454.  Specification of Letters Patent.  Patented Jan. 28, 1913.

Application filed May 10, 1912.  Serial No. 696,406.

*To all whom it may concern:*

Be it known that I, JOHN ROUSE, Jr., a citizen of the United States, and a resident of the city of North Chicago, county of Lake, and State of Illinois, have invented certain new and useful Improvements in Skinning-Knives, of which the following is a specification.

My invention relates to skinning knives and more specifically to a tool of this character designed especially for use by butchers or in slaughtering houses for removing the skins or hides of animals.

The object of my invention is the production of a skinning knife, as mentioned, which will be so designed as to be adapted for use in readily and expeditiously removing the skin or hide of an animal without fear of injury to the hide in the course of removal.

A further object is the production of a knife, as mentioned, which will be of simple and economical construction, and efficient in use.

Other objects will appear hereinafter.

The invention consists in the combinations and arrangements of parts hereinafter described and claimed.

The invention will be best understood by reference to the accompanying drawing forming a part of this specification, and in which—

Figure 1 is a side elevation of a skinning knife, embodying my invention, Fig. 2 is an enlarged fragmentary detail of a portion of the serrated edge of the blade of the knife, Fig. 3 is an edge view of the portion shown in Fig. 2, Fig. 4 is a section taken on line $x$—$x$ of Fig. 2, and Figs. 5 and 6 are enlarged sections taken on lines $y$—$y$ and $z$—$z$, respectively of Fig. 1.

The preferred form of construction, as illustrated in the drawing comprises a blade 1 which is provided with a suitable handle 2. The outer end of the blade 1 is preferably curved, as shown, the convex edge of said blade being serrated to form a series of outwardly tapering teeth 3. The inclined edges 4 of said teeth are sharpened by beveling the opposite sides of each of said edges, as clearly shown in Fig. 3. The apexes of said teeth are blunt, as clearly shown in Fig. 4 so that in using the tool said apexes will not be capable of cutting the substance with which the same are brought into contact. By thus forming the cutting or operative edge of the blade the cutting edge portions proper 4 will be guarded and so that in using the tool, injury to the skin or hide being removed by reason of the latter being accidentally sliced or cut into, will be obviated, the blunt apexes of the teeth 3, during operation of the device, being pressed between the hide and flesh to find the way, the cutting edge portions 4 cleaving the flesh only by reason of the pressure applied to the blade which will cause the edges 4 to contact with the substance against which the apexes of the teeth 4 are pressed. Beveling of the teeth 3 to form the cutting edges 4 also aids in the production of a knife in which the cutting edge portions proper will be effectually guarded or protected to prevent injury to the hide or skin which is removed.

The rear edge of the blade 1 at the outer end thereof is beveled to form a cutting edge portion 5 and the front edge of said blade adjacent the handle is beveled to form a cutting edge portion 6. The cutting edge portions 5 and 6 may be utilized in the ordinary manner for cutting purposes in effecting the dissection of an animal.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A skinning knife comprising a handle, and a blade, one edge of said blade being provided with teeth, the outer ends of said teeth being blunt, corresponding inwardly extending edges of said teeth being sharp, substantially as described.

2. A skinning knife comprising a handle, and a blade, one edge of said blade being serrated to form teeth, the outer ends of said teeth being blunt, corresponding sides of said teeth being made sharp by beveling, substantially as described.

3. A skinning knife comprising a handle, and a blade, one edge of said blade being serrated to form teeth, the apexes of said teeth being blunt, each of said teeth being formed with one edge inclined to said edge of said blade, said inclined edge being sharpened, substantially as described.

4. A skinning tool comprising a blade, and a handle provided at one end of said blade, one edge of said blade being serrated to form outwardly tapering teeth, the apexes of said teeth being blunt, corresponding edges of said teeth being made sharp by beveling the opposite sides of each of said edges, substantially as described.

5. A skinning knife comprising a blade, and a handle at one end of said blade, one edge of said blade being serrated to form outwardly tapering teeth, the apexes of said teeth being blunt, the edges of said teeth facing toward said handle being made sharp by beveling the opposite sides of each of said edges, substantially as described.

6. A skinning knife comprising a handle, and a blade, one edge of said blade being provided with teeth, the outer ends of said teeth being blunt, corresponding inwardly extending edges of said teeth being sharp; and sharpened cutting edge portions provided on said blade adjacent said handle and adjacent the outer end of said blade, substantially as described.

In testimony whereof I have signed my name to this specification in the presence of two subscribing witnesses.

JOHN ROUSE, Jr.

Witnesses:
ARTHUR A. OLSON,
JOSHUA R. H. POTTS.